United States Patent Office 3,671,202
Patented June 20, 1972

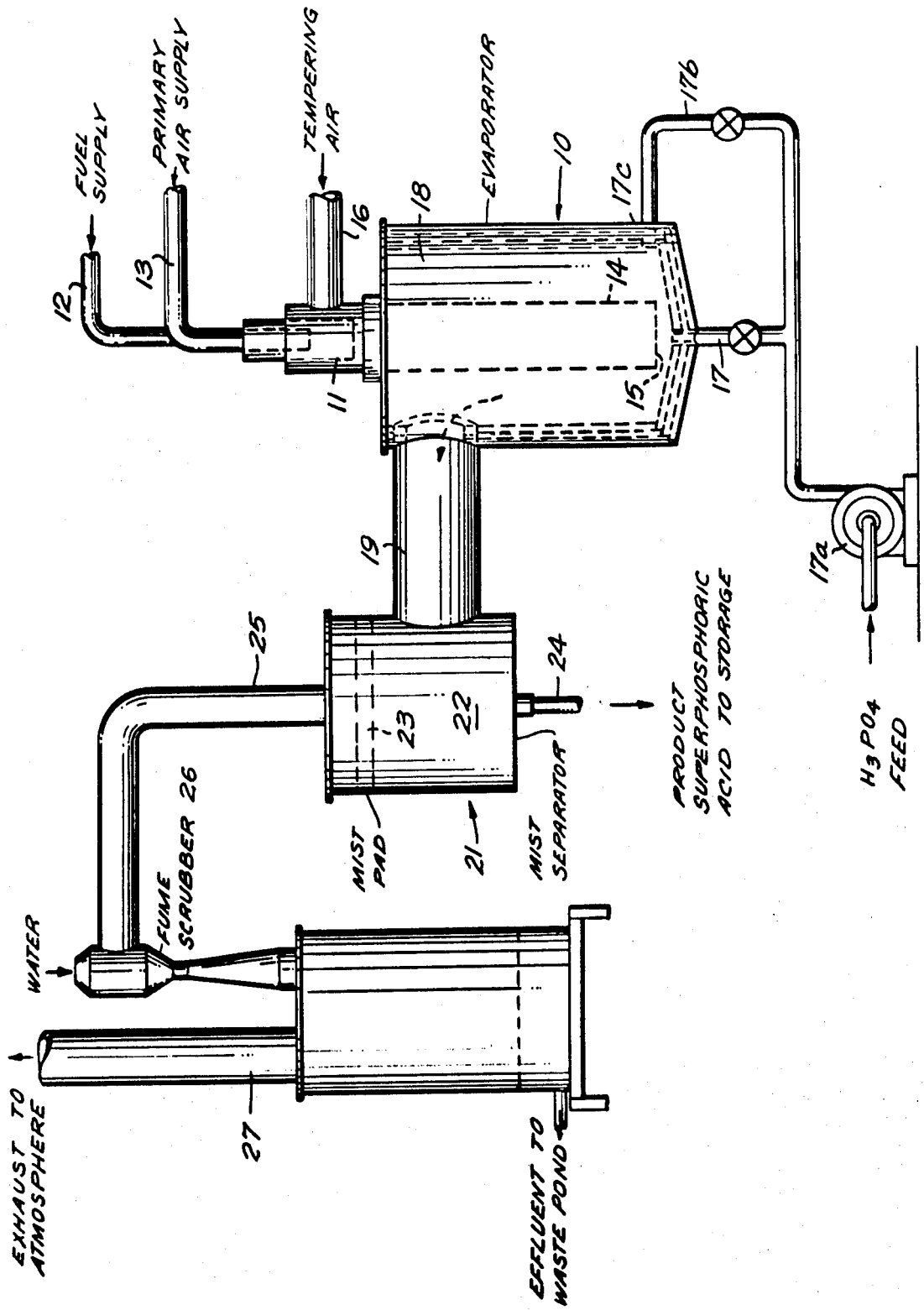

3,671,202
CONCENTRATION OF WET-PROCESS
PHOSPHORIC ACID
Charles J. Esterhoy, Jr., Morris Plains, and William D. Hunter, Jr., Smokerise, Kinnelon Borough, N.J., assignors to Allied Chemical Corporation, New York, N.Y.
Filed Feb. 21, 1964, Ser. No. 346,514
Int. Cl. B01d 1/14; C01f 25/22
U.S. Cl. 23—307                                7 Claims

ABSTRACT OF THE DISCLOSURE

This invention relates to the concentration of wet-process phosphoric acid to produce superphosphoric acid by contacting wet-process phosphoric acid, preferably containing from about 50–55% $P_2O_5$, with a stream of hot combustion gases in such a volume and at such a velocity to substantially completely entrain all of the wet-process phosphoric acid, continuously feeding the stream of heating gas containing the entrained acid into a zone where coalescence of the acid particles is effected and continuously removing the resulting superphosphoric acid.

---

This invention relates to the concentration of wet-process phosphoric acid, particularly the concentration of wet-process phosphoric acid containing from about 50–55% $P_2O_5$ to produce superphosphoric acid, i.e., phosphoric acid containing polyphosphates. All percentages and parts herein are given on a weight basis.

Wet-process phosphoric acid is commonly produced by treating phosphate rock with a strong mineral acid, usually sulfuric acid. Wet-process phosphoric acid concentrated to about 55% $P_2O_5$ has a boiling point of about 300° F. and is a viscous liquid in which all of the phosphate is in the ortho form; the expression phosphate is used herein in its commonly accepted broad meaning as referring to the $P_2O_5$ content of the phosphoric acid. As orthophosphoric acid is concentrated it becomes more viscous. The boiling acid is highly corrosive and its handling during concentration presents a number of difficult problems because of the presence of fluorine containing compounds, its highly corrosive properties, its high viscosity and for other reasons.

Superphosphoric acid, i.e., phosphoric acid containing a portion, desirably at least 50%, and preferably from 60% to 70% of the total $P_2O_5$ in the polyphosphate form, i.e., as non-ortho $P_2O_5$, is advantageous for many uses as compared with orthophosphoric acid. For example, the transportation and storage costs are lower per unit weight of $P_2O_5$, and for a given amount of the respective acids solid and liquid fertilizers of higher $P_2O_5$ analysis can be made with the use of superphosphoric acid.

A process for concentrating wet-process phosphoric acid to produce a superphosphoric acid containing about 70% $P_2O_5$ is disclosed in vol. 53 No. 9, September 1961 of Industrial and Engineering Chemistry. In this process the wet-process phosphoric acid is introduced beneath the surface of a pool of the acid. Combustion products are also introduced into the pool of acid through a submerged burner. Superphosphoric acid containing a mixture of ortho and polyphosphoric acids is withdrawn at a fixed level from the pool, cooled and discharged to storage. Exhaust gases exit from the vapor region above the pool of acid into an entrainment separator where acid mists are coalesced and the resultant product acid flows by gravity to the product sump. Exit gases from the entrainment separator are scrubbed with water and the gas from the scrubber exhausted to the atmosphere.

This submerged burner process of concentrating wet-process phosphoric acid has, among others, the following disadvantages:

(1) Start-up periods are prolonged; from 3 to 6 hours are required to attain equilibrium conditions to produce the desired strength of superphosphoric acid with consequent loss of product during the start-up.

(2) Due, probably, to the relatively long residence time of the acid within the pool and for other reasons, insolubles are formed and contaminate the product.

(3) The product produced invariably has such a high content of fluoride that it cannot be used as a raw material for the production of feed grade products.

(4) The concentration of the non-ortho $P_2O_5$ component, i.e., the polyphosphates, of the product acid fluctuates in the product as variations occur in the distribution of the hot gas within the pool of liquid being concentrated. Moreover, the percentage of non-ortho $P_2O_5$ in the product acid when the concentration is effected at acid pool temperatures of about 500° F. is relatively low, usually about 50% of the total $P_2O_5$ in the acid.

It is among the objects of the present invention to provide a process for concentrating wet-process phosphoric acid which is efficient in operation and results in a super-phosphoric acid having a low fluoride content and a high non-ortho $P_2O_5$ content.

Another object of this invention is to provide such process in which start-up times are short and which results in a product superphosphoric acid substantially free of insolubles.

Other objects and advantages of this invention will be apparent from the following detailed description thereof.

In accordance with this invention the wet-process phosphoric acid is fed continuously into an evaporation zone where it is contacted with heating gases, such as tempered combustion products entering the evaporation zone at a temperature of from 600° F. to 1800° F., preferably 700° F. to 1400° F., the amount and velocity of the gas being controlled relative to the amount of wet-process acid supplied so that entrainment of all of the acid in the gas stream in the form of droplets takes place within a retention time of the acid in the evaporation zone of not more than 5 seconds, preferably not more than about 2 seconds. The resultant hot gas stream carrying the entrained particles of acid and water vapor are passed continuously through a second zone where the liquid droplets are coalesced and the liquid superphosphoric acid thus produced withdrawn as product. The lean gases, i.e., the heating gases from which the superphosporic acid has been separated, are quenched, scrubbed with water and the uncondensed gases leaving the scrubber disposed of in any desired manner, for example, by discharge into the atmosphere.

The second zone in which the liquid droplets are coalesced is desirably maintained at substantially the same temperature as the vapor space in the evaporator or concentration zone. This is readily effected by passing the hot gases containing the entrained superphosphoric acid through the second zone without cooling except as such cooling is inherent in heat radiation losses from the equipment. Operating in this manner, the temperature in the second zone is from 5° F. to 10° F. below that in the vapor space which can be from 475° F. to 600° F., preferably 540° F. to 550° F. If desired, however, the second zone in which coalescence of the superphosphoric acid droplets takes place or the stream of heating gases containing the entrained droplets of superphosphoric acid can be cooled to effect condensation of the superphosphoric acid. Such cooling should be effected under controlled conditions to produce superphosphoric acid having a relatively high content of polyphosphates.

In general, cooling to a temperature below 475° F. of either the hot gas stream or the second zone where coalescence of the droplets of superphosphoric acid is effected should be avoided.

The accompanying drawing is a flow sheet showing a preferred arrangement of equipment for practicing the process of this invention.

In the drawing, 10 is an evaporator in the form of a cylindrical or other shaped vessel, desirably a stainless steel vessel lined with carbon-brick. Communicating with the top of evaporator 10 is a combustion chamber 11 provided with a fuel gas inlet 12 for supplying fuel gas, such as natural gas or other heating medium, to the combustion chamber 11. Air to support combustion of the fuel is supplied through a line 13. A downcomer 14 communicates with the combustion chamber 11 and extends to discharge outlet 15 located near the base of the evaporator 10. Tempering air is supplied through a pipe 16 to the heating gases exiting from the combustion chamber into the downcomer 14.

Wet-process phosphoric acid is fed continuously into the base of the evaporator 10 through a valve-controlled line 17, communicating with a pump 17a. Line 17 discharges the acid upwardly along the longitudinal axis of evaporator 10 in a direction opposite to the discharge of tempered heating gases from the downcomer 14 the axis of which is coincident with that of evaporator 10. A valve-controlled line 17b permits supply of wet-process phosphoric acid into the base of the evaporator through the pot 17c positioned at the periphery of the evaporator. Pipe 17 is the preferred inlet for the wet-process phosphoric acid. Both pipes 17 and 17b can be used for the supply of the acid.

The rate of feed of the acid is correlated with the velocity and volume of air tempered combustion products exiting from the downcomer 14 so that all of the acid is entrained in the combustion products exiting from 14 and flowing into the annular vapor space 18 surrounding the downcomer 14; this vapor space 18 is defined by the inner walls of the evaporator or concentrator 10 and the outer walls of the downcomer 14. The superphosphoric acid laden gases flow through line 19 into the mist separator 21, which in the embodiment shown in the drawing comprises a cylindrical or other shaped carbon-brick lined stainless steel vessel 22 having at its top a mist pad 23. Pad 23 consists, in the embodiment shown in the drawing, of stainless steel wool having a density of from 9 to 11 pounds per cubic foot arranged to provide a layer or thickness from 6" to 12", preferably about 6", positioned at the top of the mist separator 21 as shown in the drawing. As the superphosphoric acid laden gases flow through the stainless steel wool, droplets of superphosphoric acid coalesce and flow by gravity to the base of the mist separator 21 exiting therefrom through the discharge line 24. Heating gases from which the droplets of superphosphoric acid have been removed exit through line 25 leading into a fume scrubber 26 of any known type. Gases from the fume scrubber are exhausted to the atmosphere through exhaust duct 27.

The mist separator 21, shown for purposes of exemplification, represents a preferred type of equipment for effecting coalescence of the droplets of acid carried by the heating gas stream. Any suitable equipment for coalescing liquid particles, resistant to corrosion, can be used. Mist separator 21, in the preferred embodiment, in which the superphosphoric acid laden gases pass therethrough without cooling is at a temperature of from 5° F. to 10° F. below that of the vapor space 18.

In the practice of the process, orthophosphoric acid is fed continuously through line 17 beneath the hot gas downcomer discharge within the evaporator 10. Products of combustion mixed with the tempering air introduced at 16 are both controlled to give a temperature of from 600° F. to 1800° F., preferably 700° F. to 1400° F., in the downcomer at a suitable control point, desirably located a distance from the top of the downcomer equal to from ½ to ¾ the length of the downcomer. These heating gases are passed through the downcomer at a velocity of 50 to 250 feet per second, preferably 70 to 200 feet per second. No acid level, i.e., no body of liquid acid, is maintained within the evaporator 10, but the liquid is entrained in the flowing heating gas stream as it enters the evaporating zone, the resultant stream of heating gas carrying the entrained phosphoric acid flowing through the annular vapor space 18 into the liquid coalescing zone or mist separator 21. Operating in this manner the temperature in the vapor space 18 is within the range of from 475° F. to 600° F., preferably 540° F. to 550° F., and the velocity of the heating gas carrying the entrained liquid particles through the vapor space 18 is from 0.75 to 10 feet per second, preferably 3.5 to 8 feet per second. The retention time of the acid in the evaporating zone does not exceed 5 seconds and preferably is less than 2 seconds.

The superphosphoric acid laden heating gases exit through conduit 19 and enter the mist separator 21 where the acid droplets are coalesced by impingement of the acid droplets onto the stainless steel wool forming the mist pad 23, as the heating gas stream carrying the entrained superphoshoric acid flows through this mist pad. The condensed acid flows by gravity through the exit line 24 into a storage tank where it can be cooled prior to use. Lean gases are exhausted through line 25 from the mist separator 21 and are quenched, scrubbed and the uncondensed gas suitably disposed of, for example, by discharge into the atmosphere.

An important feature of the invention is the feed of the heating gas through the downcomer 14 at a velocity and in a volume to effect substantially complete entrainment of the orthophosphoric acid upon contact therewith at or near the discharge outlet 15 from the downcomer and the flow of the heating gases containing the entrained acid particles through the annular vapor space surrounding the downcomer 14 into the conduit 19 leading into the mist separator 21 so that the residence time of the acid in the evaporator does not exceed 5 seconds, preferably less than about 2 seconds. In this way the heating gas containing the entrained acid droplets flow in heat exchange with the hot gases passing down through the downcomer with consequent rapid reaching of equilibrium condition to obtain superphosphoric acid of high non-ortho $P_2O_5$ content in the product and this with short retention times in the evaporator not exceeding 5 seconds and preferably less than about two seconds with consequent production of product containing little or no water-insolubles.

As a general rule the proportion of non-ortho $P_2O_5$ in the product bears a direct relation to the temperature in the vapor space. With vapor space temperatures of about 540–545° F. concentrating 75% orthophosphoric acid (the rest being chiefly water) a product acid can be obtained having about 74% total $P_2O_5$ of which 66.4% is non-ortho $P_2O_5$. By operating at a lower vapor space temperature these values are reduced. By increasing the temperature about 50° F. the total $P_2O_5$ content can be increased to 79% to 80% with an increase in the non-ortho percentage content to about 72%.

The following examples are given to illustrate a preferred practice of the process of this invention. It will be appreciated, however, that the invention is not limited to these examples. These examples were carried out in equipment such as shown in the drawing in which the mist separator 21 had a 6" thick mist pad at its top consisting of stainless steel wool having a density of from 9 to 11 pounds per cubic foot.

EXAMPLE I

The orthophosphoric feed acid employed in this example contained about 50% $P_2O_5$, about 2.0% $H_2SO_4$, about 1.2% $Fe_2O_3$, about 0.8% $Al_2O_3$, about 0.5% F and about 45.5% $H_2O$.

From 10 to 12 gallons per minute of the feed acid were fed to the evaporator 10 and contacted with 7500 s.c.f.m. air tempered combustion products produced by burning from 90 to 110 s.c.f.m. natural gas. Tempering air was supplied to the combustion products at a rate controlled by the temperature in the vapor space 18 to maintain this temperature at about 540° F. Under these conditions the retention time of the acid liquid in the evaporator 10 was from 1 to 1.5 seconds. The hot gas stream laden with superphosphoric acid droplets passed through the mist separator 21 at a velocity of approximately 15 feet per second.

98% of the $P_2O_5$ values of the acid feed were thus recovered as superphosphoric acid essentially free of insolubles containing 65% non-ortho $P_2O_5$ of the total $P_2O_5$ which was 74.0%. The product contained less than 0.1 weight percent of insolubles.

EXAMPLE II

The wet-process phosphoric acid feed contained 53.5% $P_2O_5$. 9.6 gallons per minute of this acid was fed to the evaporator. 6160 s.c.f.m. of heating gases produced with a fuel consumption of $3.5 \times 10^{-6}$ B.t.u. per net ton of $P_2O_5$ fed and containing 4850 s.c.f.m. of tempering air was fed to the downcomer at a velocity of 212 feet per second. The temperature in the downcomer at about ¾ the distance from its top was 1050° F.; the temperature in the vapor space 18 was 540–545° F. All of the acid was evaporated upon contact with the hot gases; no body of liquid was formed in the evaporator. The retention time within the evaporator was 1.2 seconds. The heating gases laden with superphosphoric acid droplets passed through the mist separator 21 which was at a temperature of 540° F. Superphosphoric acid was continuously withdrawn from the mist separator. It contined 73.9% $P_2O_5$, of which 66.4% was non-ortho $P_2O_5$. The product contained at most a trace of fluoride and was suitable for use in making feed grade products.

In the table which follows is given a comparison of the conditions and of the product produced by the process of this invention and the process hereinabove mentioned involving the use of a submerged burner in a pool of the acid, which process is hereinafter referred to as the submerged burner process. In both cases wet-process phosphoric acid containing 75% orthophosphoric acid and about 25% water was concentrated under the conditions given in the table.

TABLE

| | Process of this invention | Submerged burner process |
|---|---|---|
| Feed acid rate, lb./hr. $P_2O_5$ | 4,800 | 400 |
| Natural gas heat input B.t.u.$\times 10^6$/ton $P_2O_5$ fed. | 3.0 | 3.3 |
| Average temperature, ° F.: | | |
| Inlet gas | 900 | 1,303 |
| Acid pool | (¹) | 516 |
| Exhaust gas | 540 | 515 |
| Product acid percent by weight: | | |
| Total $P_2O_5$ | 74.0 | 70.9 |
| Non-ortho $P_2O_5$ percent of total | 65 | 47.7 |
| F | 0.1 | 0.2 |
| $Fe_2O_3$ | 2.0 | 1.8 |
| $Al_2O_3$ | 1.7 | 1.8 |
| $H_2SO_4$ | 3.4 | 2.9 |

¹ No pool.

It will be noted from the data in this table that the process of this invention results in a product having higher non-ortho $P_2O_5$ concentrations and this even though the inlet heating gas temperature is markedly lower, 900° F. as compared with 1303° F. in the submerged burner process. Furthermore the process of this invention with an exhaust gas temperature of about 540° F. gives a product from 75% orthophosphoric acid containing 74% total $P_2O_5$ of which 65% is non-ortho $P_2O_5$.

To obtain a product containing 74.8% $P_2O_5$ from 75% orthophosphoric acid by the submerged burner process requires an exhaust gas temperature of about 600° F. Such product can also be produced from 75% orthophosphoric acid by atmospheric pressure evaporation at a 680° F. boiling point.

Moreover, the process of this inveniton gives a marked reduction in the fluoride content of the product; products can be produced containing only a trace of fluoride and hence suitable for the production of feed grade products.

The reduction of retention time of the liquid acid in the evaporator in the process of this invention substantially eliminates solids in the product acid facilitating product handling during subsequent processing operations. In the submerged burner process on the other hand, dependent upon the retention time, substantial amounts of solid formation takes place. For example, with a retention time of 20 minutes at 500° F. about 24.6 weight percent water insoluble solids are produced in the submerged burner process. The product acid produced by the process of this invention is substantially free of insolubles, less than 0.1 weight percent.

In the process of this invention the start-up period is governed chiefly by the time required for the evaporator lining to reach steady-state temperature, i.e., the heat flux of the evaporator lining. Once the evaporator lining is brought to steady-state operating temperature, operation proceeds with the production of a uniform product. This start-up time is comparatively short particularly as compared with the starting up time for reaching steady-state operating conditions in the submerged burner process. The latter requires from 3 to 6 hours to attain equilibrium conditions whereas equilibrium conditions are reached in the process of this invention generally in less than 3 hours.

Since certain changes in carrying out the above process for concentrating wet-process phosphoric acid can be made without departing from the scope of this invention, it is intended that all matter contained in the above description or shown in the accompanying drawing shall be interpreted as illustrative and not in a limiting sense.

What is claimed is:

1. The process of concentrating wet-process phosphoric acid which comprises continuously feeding the wet-process phosphoric acid into an evaporation zone, continuously contacting the wet-process phosphoric acid thus fed with an oppositely directed stream of heating gas consisting of air and gaseous fuel combustion products in a volume and at a velocity to substantially completely entrain as particles in said gas stream all of the wet-process phosphoric acid fed into said evaporation zone and to maintain substantially no acid level in said zone, continuously feeding the stream of heating gas containing the entrained acid into a coalescence zone, continuously effecting coalescence of the entrained acid particles without cooling said stream more than about 10° F. below the temperature of the evaporation zone to produce superphosphoric acid, continuously removing the superphosphoric acid from said last mentioned zone and continuously removing the residual gas from said last mentioned zone.

2. The process of claim 1 in which the retention time of the phosphoric acid in the evaporation zone does not exceed about 5 seconds.

3. The process of claim 1 in which the retention time of the phopshoric acid in the evaporation zone does not exceed about 2 seconds.

4. The process of concentrating wet-process orthophosphoric acid in an evaporator comprising a conduit for the supply of heating gases positioned within said evaporator to define with the inner walls of said evaporator an annular vapor space, said conduit having its outlet positioned near and directed toward an end wall of said evaporator, which process comprises continuously feeding a stream of heating gas consisting of air and gaseous fuel combustion products through said conduit, continuously feeding an oppositely directed stream of orthophosphoric acid into the vicinity of the outlet of said conduit, said heating gas being fed at a velocity and in a volume to substantially completely entrain as particles in said gas stream the orthophosphoric acid within a retention time of the acid in the evaporator not exceeding 5 seconds and to maintain substantially no acid level in said evaporator, continuously feeding the stream of heating gas containing the entrained phosphoric acid thus produced through the annular vapor space and thence into a coalescence zone where coalescence of the entrained acid particles is effected without cooling said stream more than about 10° F. below the temperature of the space to produce superphosphoric acid as product, and continuously removing the superphosphoric acid and the residual gas from the coalescence zone.

5. The process of concentrating wet-process phosphoric acid containing from 50 to 55% by weight of $P_2O_5$ to produce superphosphoric acid in an evaporator comprising a combustion chamber communicating with a downcomer extending from the top of the evaporator to near the bottom thereof for the supply of heating gases from the combustion chamber to the evaporator, said downcomer being positioned within said evaporator to define with the inner walls of said evaporator an annular vapor space, which process comprises continuously feeding to the combustion chamber a heat generating medium consisting of gaseous fuel and air to support combustion thereof to produce products of combustion, continuously feeding the products of combustion downwardly through said downcomer, continuously introducing an oppositely directed stream of orthophosphoric acid into an evaporator at a point close to the discharge of the heating gases from the downcomer, the volume and velocity of said heating gases being such as to entrain substantially all of the orthophosphoric acid introduced into the evaporator with a retention time of the acid in the evaporator not exceeding two seconds and to maintain substantially no acid level in said evaporator, continuously flowing the resultant stream of heating gas containing entrained phosphoric acid through the annular vapor space and then into a zone where coalescence of the entrained acid particles is effected without cooling said stream more than about 10° F. below the temperature of the vapor space to produce superphosphoric acid as product, and continuously removing the superphosphoric acid and the residual gas from said zone.

6. The process as defined in claim 5, in which the said zone contains a mist separator for effecting coalescence of the acid particles, combustion gas admixed with tempering air, the mixture being at a temperature of 600° F. to 1800° F. is passed through the downcomer, the vapor space is at a temperature of from 475° F. to 600° F., and the mist separator is at a temperature of from 5° F. to 10° F. below the temperature of the vapor space in the concentrator.

7. The process as defined in claim 6, in which the temperature of the heating gases passing through the downcomer is within the range of from 700° F. to 1400° F. at a control point in the downcomer spaced from the top of the downcomer a distance equal to about one-half to three-quarters the total length of the downcomer, and the temperature of the vapor space in the evaporator is from 540° F. to 550° F.

References Cited
UNITED STATES PATENTS

| | | | |
|---|---|---|---|
| 2,977,196 | 3/1961 | Fleming | 23—165 |
| 2,999,010 | 9/1961 | Striplin | 23—165 |
| 3,044,855 | 7/1962 | Young | 23—165 |
| 3,057,700 | 10/1962 | Gross | 23—169 X |
| 3,104,947 | 9/1963 | Switzer | 23—165 |
| 3,073,683 | 1/1963 | Switzer | 159—16 X |
| 3,279,526 | 10/1966 | Mustian | 159—16 X |

FOREIGN PATENTS 822,394 9/1937 France.

NORMAN YUDKOFF, Primary Examiner

S. J. EMERY, Assistant Examiner

U.S. Cl. X.R.

23—165, 275; 159—16, 47